Nov. 28, 1933.    A. E. LONG    1,937,392
TIMING AND SIGNALING DEVICE
Filed Aug. 17, 1931    5 Sheets-Sheet 1

Inventor:
Albert E. Long.
By Jones, Addington, Ames & Seibold
Attorney.

Inventor:
Albert E. Long
By Jones, Addington, Ames & Seibold
Attorneys.

Nov. 28, 1933.  A. E. LONG  1,937,392
TIMING AND SIGNALING DEVICE
Filed Aug. 17, 1931   5 Sheets-Sheet 3

Inventor:
Albert E. Long
By Jones, Addington, Ames & Seibold
Attorneys.

Nov. 28, 1933.  A. E. LONG  1,937,392
TIMING AND SIGNALING DEVICE
Filed Aug. 17, 1931  5 Sheets—Sheet 4

Inventor
Albert E. Long
By Jones, Addington, Ames Seibold
Attys.

Nov. 28, 1933.  A. E. LONG  1,937,392
TIMING AND SIGNALING DEVICE
Filed Aug. 17, 1931  5 Sheets-Sheet 5
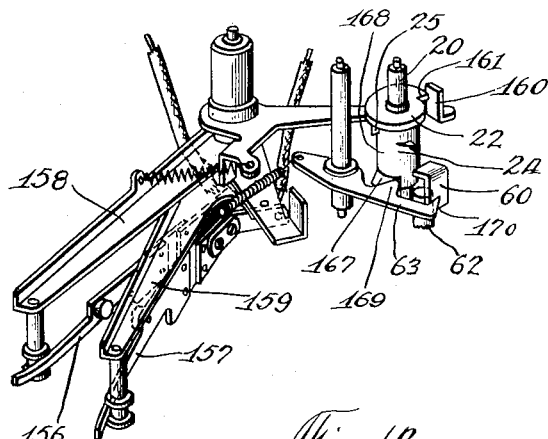
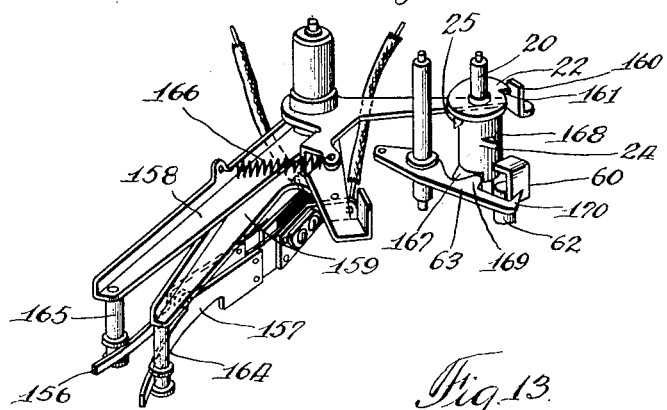
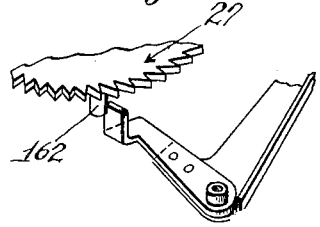
Inventor:
Albert E. Long Patented Nov. 28, 1933

1,937,392

UNITED STATES PATENT OFFICE 1,937,392

TIMING AND SIGNALING DEVICE

Albert E. Long, Chicago, Ill., assignor to Stromberg Electric Company, Chicago, Ill., a corporation of Maine Application August 17, 1931. Serial No. 557,702

26 Claims. (Cl. 200—35)

My invention relates to improvements in timing and signaling devices, and is particularly adaptable for use in connection with the control of operation of machinery that requires attention at certain fixed and definite intervals, as for example in vulcanization, molding of plastic materials, heat treatment of metals, and the like.

This application is a continuation in part of my co-pending application, Serial No. 238,256, filed December 7, 1927.

One of the objects of my invention is to provide means, which, in a small self-contained device, will give visible or audible signals at definite and selected intervals of time with accuracy and certainty.

A further object of my invention is to provide a timing device or clock which can be set to give a signal at definite intervals. These intervals may be varied at will by suitable setting means and the giving of the signal will be repeated at selected intervals without the necessity of giving the device any attention.

A further object of my invention is to provide a timing device or clock, of the type already mentioned, which comprises means which, during the entire period between signals, will show the length of time remaining before the signal will be given.

A further object of my invention is to provide a timing device that can be operated electrically from any ordinary electric lamp socket so that it will not require winding to keep it in motion.

Other objects will appear in connection with the description and drawings which are a part of this specification.

In the drawings,

Fig. 11 is a perspective view of the switch mechanism showing both contacts in their remote position;

Fig. 12 is a perspective view showing the contacts in closed position, and

Fig. 13 is a perspective view showing the pin engaging one of the switch operating arms.

Figure 1:
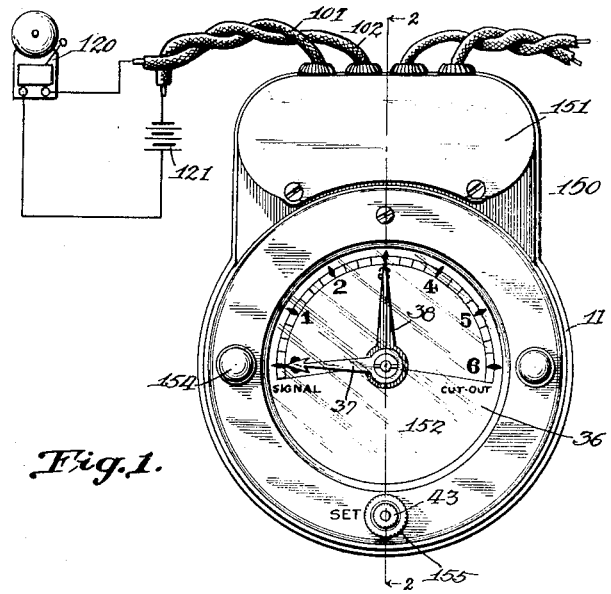
Figure 1 is a front elevation of the device embodying my invention.

In the description which is to follow, it should be borne in mind that my invention provides a mechanism that will gradually and regularly propel forward a rotatory ratchet until the same arrives at a predetermined position, whereupon by the release of a trigger mechanism the ratchet will be caused to assume very rapidly its original position, to be thereupon propelled forward and again tripped, this operation repeating itself periodically as long as the motor that drives the mechanism is in operation.

In the embodiment of my timing and signaling device, I provide a metallic casing 11 having superimposed thereon a tubular plastic-molded casing 12, which casings, when fastened together, form a housing for containing all the moving and operating parts of my timing mechanism. The casing 12 is secured by means of screws 13 to the metallic members 14, which, in turn, are fastened to lugs 11a cast integral with the casing 11 and extend inwardly thereof. A metallic supporting plate 15, which serves as one side of what practically is the equivalent of the supporting plate of a clock, and a corresponding plate 16 are also fastened to the lugs 11a. All of the gears, wheels, levers and other moving parts are journalled in suitable holes drilled into the plates 15 and 16, as will be fully discussed hereinbelow.

Figure 6:
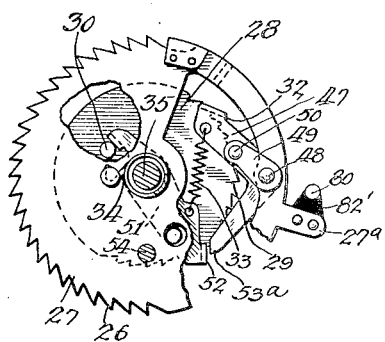
Figs. 6 and 7 are two detail views of a ratchet mechanism and trigger, which, on release of the trigger from the ratchet, causes the timing gear to resume its original position.
Figure 7:
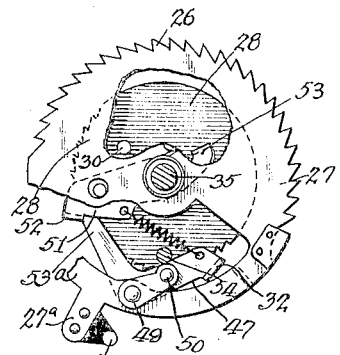

On the underside of the plate 15 is secured a synchronous electric motor 17 having a gear 18 which, in turn, intermeshes with a small gear 19. The gear 19 serves to rotate a shaft 20, which carries a disc 21 and a cam 22 (see Fig. 4), the said disc and cam being spaced apart. The disc 21 carries a lug 23 on the underside thereof and a dog 24 on the upper side thereof, a similar dog 25 being disposed on the under surface of the cam 22. As the shaft 20 rotates, thereby rotating the disc 21 and cam 22, the dog 24 upon the disc will engage individual gear teeth 26 in a ratchet 27, so that upon each complete revolution of the disc 21 the ratchet 27 will be advanced one notch. Fastened immovably to the upper side of the plate 15 is a circular ratchet 28 having teeth 29 thereon, said ratchet 28 being also provided with a lug 30. The ratchet 27 carries on the lower side thereof a pawl 32 (as best seen in Figs. 6 and 7), said pawl being restrained by a spring 33 so as to engage the teeth 29 upon the ratchet 28, thus preventing the ratchet 27 from returning to its original position which it would do were this pawl and ratchet 28 not provided, as the ratchet 27 is provided with a coiled spring 34 which tends to rotate it in a counter-clockwise direction (see Fig. 3). The said ratchet 27 has a shaft 35 extending clear from a journal in the lower plate 15, through the upper plate 16 and beyond the same through the dial 36 (Fig. 1) and carries upon the extreme end thereof an indicator hand 37. As a result of this construction, said indicator hand will move one division on the dial 36 for every tooth on the ratchet 27, which, in turn, corresponds to one complete revolution of the shaft 20 with its attached disc 21 and cam 22. As the shaft continues to rotate and to advance step by step with said ratchet 27, the hand 37 will progressively move across the dial 36 until the hand arrives at a position in alignment with another hand 38, also located on the dial, as shown in Fig. 1. The hand 38 is attached to the shaft of a gear 39 which intermeshes with a smaller gear 40, which, in turn, engages a third gear 41. Gear 41 carries a shaft 42 extending through the cover 12 of the casing and is provided at its outer extremity with a knurled knob 43. A catch (not shown) normally prevents the rotation of the gear 41 but said gear can be disengaged therefrom by a downward push of the knurled knob 43 so that it may be possible to turn the said gear by turning the knob 43, the gear 41 returning to its normal position by virtue of a spring 45 located in a tubular passage 46 through which said shaft 42 extends. The device just described and comprising gears 41, 40 and 39, serves to control the hand 38, and functions as a setting device to cause the release of the pawl 32 so that the ratchet 27 under the influence of the coiled spring 34 may revolve and return to its original position.

The trigger device which causes the pawl 32 to engage the teeth 29 and to release the same at a predetermined time is plainly illustrated in detail in Figs. 6 and 7, Fig. 6 showing the pawl in engagement with the teeth and Fig. 7 showing the pawl when it is held out of engagement with the teeth so as to permit the ratchet 27 to revolve freely. The trigger mechanism consists of a bell-crank 47 pivotally mounted on the ratchet 27 by the pivot 48, which pivot, on the opposite side of the ratchet 27, carries a lever arm 49, also connected with the bell-crank 47 by means of a pin 50. One arm of the bell-crank 47 is bent at right angles thereto, forming the pawl 32, which engages the teeth 29 upon the ratchet 28. Rotatably mounted upon the shaft 35 of the ratchet 27 is a lever 51 connected with the aforesaid bell-crank 47 by means of the spring 33. The lever 51 has two projecting lugs 52 and 53, one at each extremity. The lug 52 is capable of engaging the long end 53a of the bell-crank 47 so that when the long end is pushed over the projection 52 it will latch therewith forming thereby a trigger mechanism which is capable of being tripped by the contact of the lug 53 with the projecting lug 30 located upon the rigidly supported ratchet 28 (Fig. 6). When the lug 53 contacts with the part 30 it will move the lever 51 a short distance and cause the disengagement of the long end of the bell-crank 47 so that it may assume the position shown in Fig. 6, whereas when the mechanism is in engagement, the position will be as shown in Fig. 7.

The purpose of this mechanism is to cause the release of the pawl 32 from the teeth 29 at a given setting of the indicator hand 38, this being brought about as follows:

Mounted upon the gear 39 is a pin 54 which engages and trips the pin 50 connecting the lever 49 with the bell-crank 47 upon the rotation of the ratchet 27 so that the trigger mechanism will thereby be set and the pawl 32 released from its engagement with the teeth 29. Inasmuch as the gear 39 which it will be seen is connected with the hand 38 is capable of being rotated by manipulation of the knurled knob 43 and its associated train of gears, it will be seen that the setting of the said trigger mechanism can be controlled at will so as to take place at a given position in the course of rotation of the ratchet 27. As the ratchet rotates, it will cause contact of the lug 52 with the lug 30, thereby releasing the trigger mechanism and again allowing the pawl 32 to engage the teeth 29 so that the operation may repeat itself.

Figure 2:
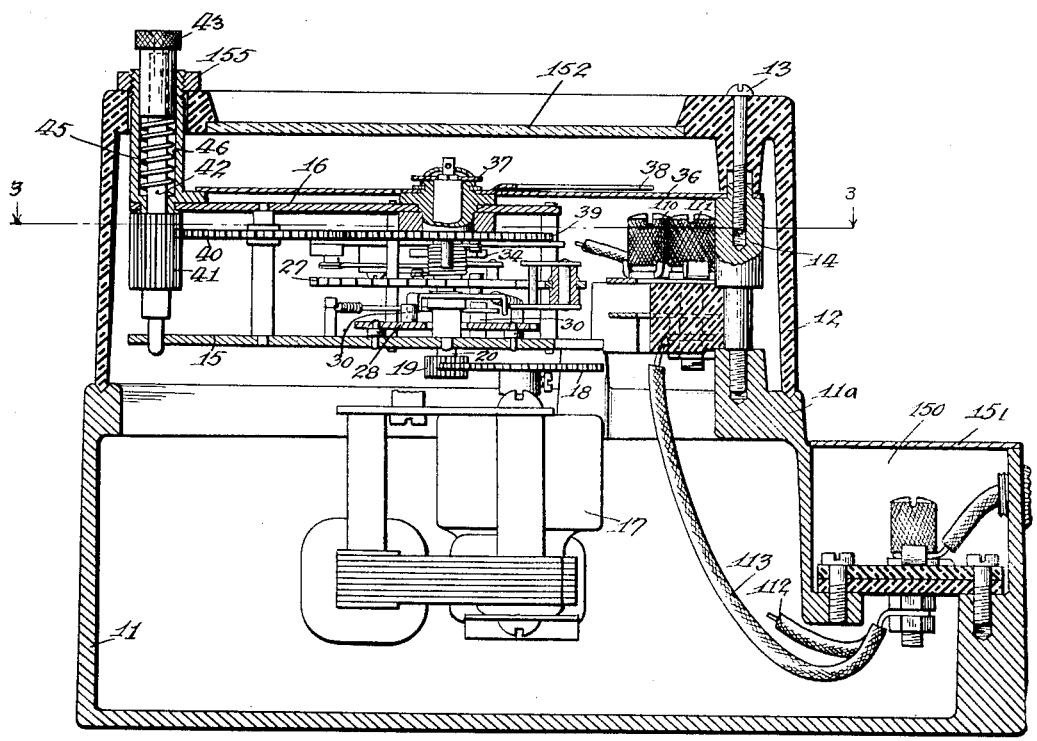
Fig. 2 is a sectional elevational view, taken along the line 2—2 of Fig. 1.
Figures 4, 5:
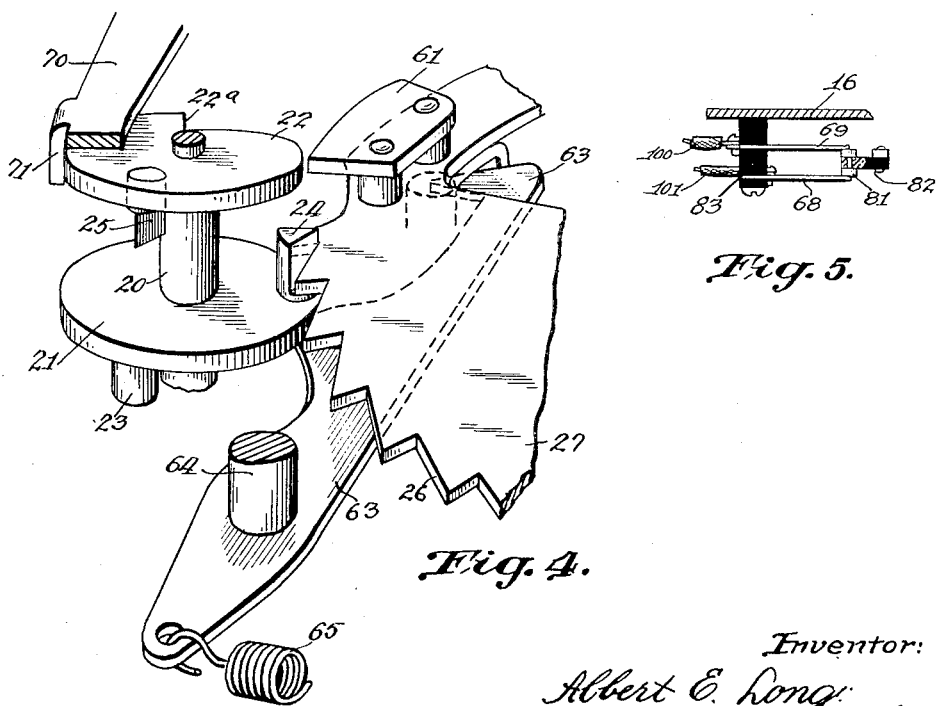
Fig. 4 is a detail of the mechanism employed in progressively advancing the time indicator gear.
Fig. 5 is a detail of one of the electrical switches incorporated in the apparatus.
Figure 8:
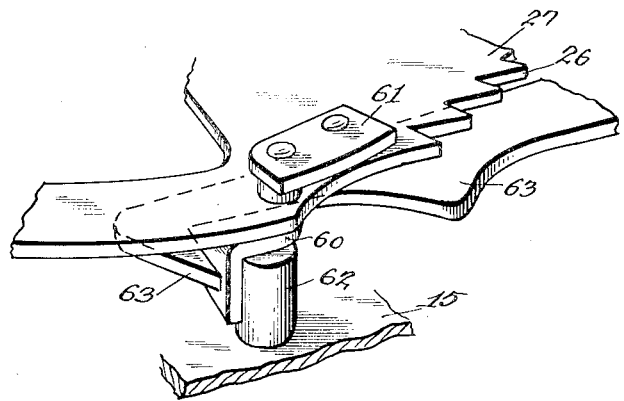
Fig. 8 is a detail of the latch mechanism that assures the accurate return of the gear to its original position.
Figure 9:
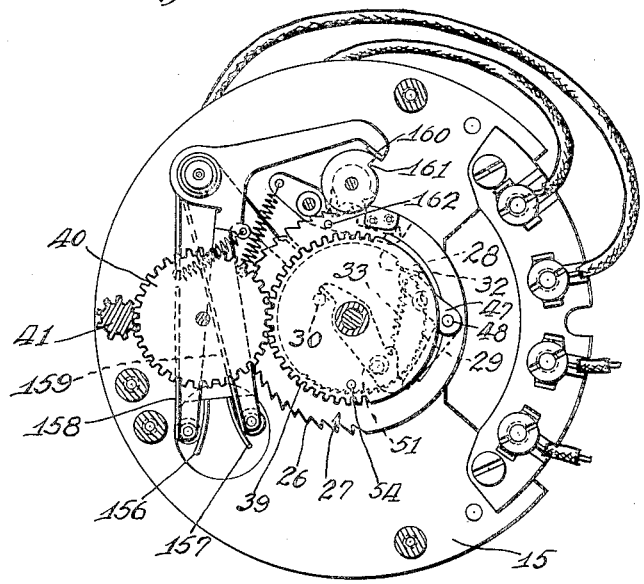
Fig. 9 is a sectional plan view showing a different form of switch construction.
Figure 10:
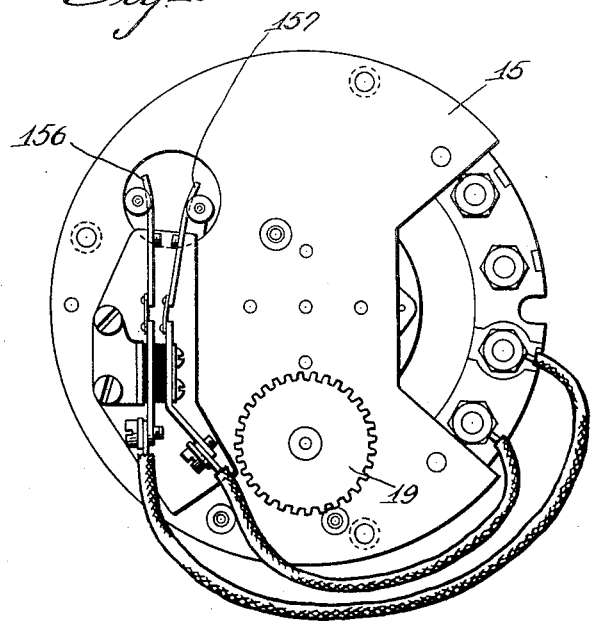
Fig. 10 is a bottom plan view of the construction of Fig. 9.

In order to prevent the rebound of the ratchet 27 when it suddenly returns to its original position, the arrangement best seen in Fig. 8 is provided. That is to say, when the apparatus is in the position illustrated in Figs. 2 and 8, the under side of the ratchet 27 is provided with a lug 60 riveted thereto and the upper side of the ratchet is provided with a plate 61. A stop 62 is rigidly connected to the upper side of the plate 15 and is so positioned that when the ratchet 27 is in its original position, the lug 60 will rest against the stop 62, thus arresting the movement of the ratchet 27 when it turns under the influence of the spiral spring 34. In order to prevent any rebound, the spring-restrained catch 63 is provided. As the lug 60 makes contact with the stop 62, the catch 63 engages the same and holds it in a locked position, as shown in Fig. 8. The catch 63 is pivotally supported by the shaft 64 and is urged toward the stop 62 by the spring 65 (Fig. 4).

The catch 63 is released by the contact of the lug 23 when the rotation of the shaft 20 causes the simultaneous rotation of the disc 21 thereto attached. At the same time the lug 25, carried on the under side of the cam 22, makes contact with the plate 61 attached to the upper side of the ratchet 27, advancing it just far enough to allow of the engagement of the lug 24, which is located on the upper side of the disc 21, with a tooth 26 in the ratchet 27. The relationship of these lugs, teeth and ratchets is shown in detail in Fig. 4.

It will be seen, from the description thus far given, that I have provided a mechanism that will gradually and regularly propel forward a rotatory ratchet until the same arrives at a predetermined position when, on the release of a trigger mechanism, the said ratchet will be caused to assume its original position, to be thereupon again propelled forward in the manner already described, this operation repeating itself as long as the motor that drives the mechanism is in operation.

In order to employ the mechanism for operating an electric bell, relay, light, or the like, two electrical switches 66 and 68, arranged in series, are provided. These are operated by contact members 80 and 81 that are attached to the ratchet 27 and a lever 70, respectively. The lever 70, which is pivotally mounted (being attached to a shaft 73) has a short arm that is restrained by the spring 72 (see Fig. 3) and a long arm that carries at its extremity the metallic contact piece 81 which is adapted to bridge the knife edges of the switch 28, the second knife edge being designated as 69 in Fig. 5. The contact member 81 is carried by a small piece of insulating material 82 and the knife edges 68 and 69 are spaced apart and insulated from each other by a similar piece of insulating material 83, the latter insulating material being attached to plate 16. Suitable feed wires 100 and 101 serve to connect the knife edges 68 and 69 with the circuit, which latter will be more fully explained hereinafter.

As will be seen in Fig. 5, an electrical circuit is established between the knife edges 68 and 69 when the metallic member 81 is placed between and in contact with them. This is accomplished by movement of the arm 70. The said arm (see Fig. 4) has a projection 71 which is in contact with the cam 22, so that upon each revolution of the said cam 22 and shaft 20 the arm 70 will be moved, and the contact member 81 will be alternately placed between the knife edges 68 and 69 and removed therefrom.

Figure 3:
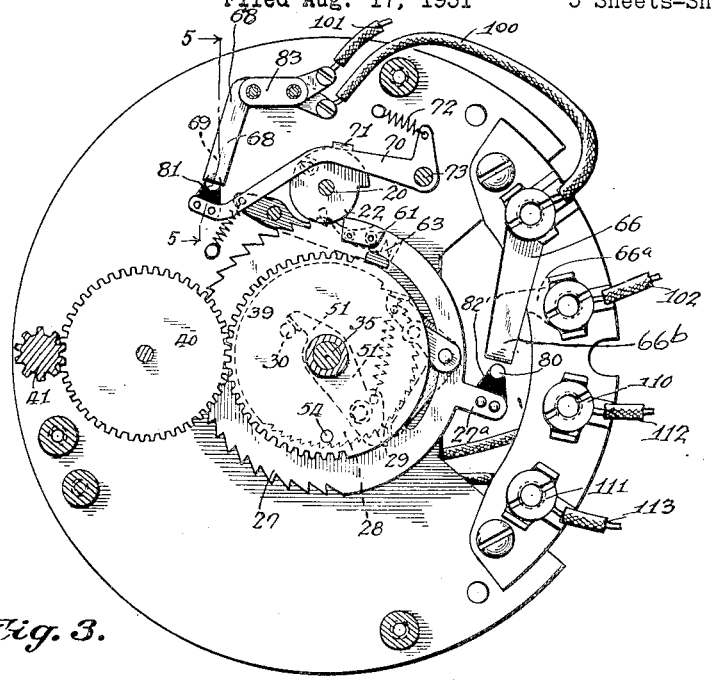
Fig. 3 is a sectional view taken along the line 3—3 of Fig. 2.

The second switch 66 (see Fig. 3) is constructed in the same manner, also having two knife edges 66b and 66a, the latter of which is not totally visible in the figures as it lies directly beneath the knife edge 66b in Fig. 3. A metallic contact member 80, mounted exactly like the member 81 already described, serves to bridge the knife edges 66b and 66a. The said member 80 is carried by a piece of insulating material 82', which, in turn, is attached to a lateral projection 27a which is part of the ratchet 27 (as shown in detail in Figs. 3, 6 and 7). Whenever the ratchet 27 is in its original position, the contact member 80 will bridge the knife edges 66b and 66a so that an electric current may pass from one of them to the other. Suitable metallic conducting wires 100 and 102 serve to connect the knife edges 66b and 66a with the circuit as will be set forth below.

Binding posts 110 and 111 are also provided for attaching wires 112 and 113 to a source of alternating electrical current for actuating the synchronous motor 17. Wires 101, 102, 112 and 113 will pass into a lateral extension 150 of the casing 11, where they are attached to suitable binding posts for attachment to a power line and a signaling circuit, respectively. A removable cover 151 permits access to the binding posts 110 and 111.

The casing cover 12 is provided with a glass 152 through which the dial 36, carrying suitable indicia as shown in Fig. 1, is visible. The casing cover 12 is additionally secured to the casing 11 by the screw caps 154 which are attached to upright supports attached to the plate 16 in a manner similar to the hollow shaft 42 shown in Fig. 2. A threaded collar 155 surrounds the shaft 42 and acts as a still further support for the casing cover 12.

The electrical circuit which serves to operate a signal bell, light, relay, or the like (Figs. 1 and 3) is as follows: Assuming, for the purposes of explanation merely, that a bell 120 is to be operated by the apparatus herein described, a source of electrical energy, such as a battery 121, is provided. One electrode of said battery is connected with the wire 101 which is in electrical connection with the knife blade 68. When the metallic member 81 is bridging knife blades 68 and 69, current may pass to the latter and thence through wire 100 to the knife blade 66b. Provided the metallic bridging member 80 is making contact with the knife blades 66 and 66a, current will flow from blade 66b to blade 66a, through wire 102 attached thereto to the bell 120 and then back to the battery 121, completing the circuit and causing the bell to ring.

It should be noted that although the arm 70 and its metallic contacting member 81 bridge the two knife edges 68 and 69 at every revolution of the shaft 20, the circuit is only completed when the metallic member 80 is also bridging the knife edges 66b and 66a. This only occurs when the ratchet 27 and the appurtenances carried thereby are in position at the time when the signal is to be given.

The operation of my improved timing apparatus is as follows: Let it be assumed that a signal is to be given every three minutes. The knob 43 is depressed and the gears 41, 40 and 39 are turned until the hand 38 rests on the mark "3" on the dial 36. Assume that the time hand 37 is at the zero point of the dial and that the motor 17 is started. This motor is so geared that it will cause the shaft 20 to make a complete revolution in 15 seconds, thus causing the cam 22 and disc 21 to make one revolution in 15 seconds. The first event that occurs is the release of the catch 63 and a forward push on the plate 61, these two events being simultaneous. Some time thereafter the dog 24 will contact with a tooth 26 of the ratchet 27 and will cause the same to advance one tooth. At the same time the cam 22 will cause the engagement of the metallic contact member 81 with the knife edges 68 and 69, when the metallic member 80, carried by the ratchet 27, will simultaneously break contact with the knife edges 66b and 66a, so that no current will flow through the signaling circuit. As the shaft 20 and its disc 21 and cam 22 make a second revolution in another 15 seconds, the ratchet 27 will be advanced another notch. The ratchet 27 is prevented from returning by the engagement of the pawl 32 which reacts against the ratchet 29.

At each revolution of the shaft 20, the ratchet 27 is advanced one notch, and inasmuch as the time hand 37 is rigidly connected to the shaft 35 secured to the ratchet 27, the said hand will progressively advance upon the dial in stages of 15 seconds until it is directly above the hand 38 which (because of the relationship of the dog 24 with the teeth 26 on the ratchet 27) will take place when the actual time elapsed will be three minutes. The projection 54 upon the gear 39 having set the trigger mechanism (already herein described in detail), the pawl 32 will be caused to disengage the teeth 29 of the stationary ratchet 28, whereupon when the dog 24 releases the teeth 26 the ratchet 27 with all its appurtenances will be quickly driven backwards by the torsion of the spring 54 so that the metallic contact member 80 will be brought between the knife edges 66b and 66a. As the position of the cam 22 will then be such that the knife edges 68 and 69 are also bridged by the member 81, the circuit will be closed. At the same time, the hand 37 will fly back to the position marked "signal" on the dial (see Fig. 1) and thereupon the hand 37 will be brought to the zero position by the continued revolution of the shaft 20 by the contact of lug 25 with plate 61 when the cam 22 will have revolved until the projecting member 71 on the lever 70 has dropped into the notch on the cam 22, thus breaking the contact of the member 81 with the knife edges 68 and 69 and breaking the electrical circuit (already described), causing the bell 120 to stop ringing. This operation will be repeated indefinitely at stated intervals as long as the hand 38 is kept at the mark "3" on the dial. The length of time of the signal can be varied either by adjusting the cam 22 angularly on the shaft 20 or by filing off the edge of the follower 71 so as to cause the circuit to be broken when the signal has been continued for the desired length of time.

Should it be desired, however, to interrupt the functioning of the mechanism, the dial hand 38 may be brought to the position at the extreme right of the dial marked "cut out" in which event the gear 39 will be advanced so far that the projection 54 thereon will be out of reach of the arm 51 of the trigger mechanism so that the hand 37 will simply oscillate back and forth between the 5 minute and 45 second interval and the 6 minute interval without the operation of any signaling device, even though the motor 17 continues to function.

The construction shown in Figs. 9 to 13, inclusive, is substantially the same as that just described, except as to the circuit controlling mechanism. In this circuit controlling mechanism, the quick closing and quick opening is accomplished by means of a single pair of contacts 156 and 157 which are controlled in their movements by means of a pair of rock levers 158 and 159, respectively.

The spring tension in the contact members 156 and 157 is such as to tend to hold them away from each other. The contact member 156 is caused to oscillate back and forth once for each revolution of the spiral cam member 22. As this spiral cam member revolves, it presses against the finger 160 on the rock arm and moves the spring contact 156 over toward the spring contact 157 until the finger 160 on the arm drops off the abrupt shoulder 161, whereupon the spring tension in the spring contact 156 will cause it to move quickly in a direction away from the other spring contact 157. The spring contact 157 is normally in a position in which it will not be engaged by the spring contact 156, even when this spring contact 156 is in its extreme proximal position. However, when the ratchet wheel 27 is released and flies back, the pin 162 (Figs. 10 and 13) on the ratchet wheel strikes the finger 163 on the bell crank rock lever 159, causing the pin 164 on the lever to press the spring contact 157 quickly over against the other spring contact 156 which, because of the timing of the mechanism, is then in a position which will permit engagement of the two contacts. Thus a quick make of the circuit is effected.

Thereafter a slight additional movement of the spiral cam 22 permits the finger 160 to drop off the shoulder 161, permitting the spring contact 156 to snap quickly away from the other spring contact 157, thus effecting a quick opening of the circuit. The arm 158 is provided with a pin 165 similar to pin 164 for cooperative engagement with the spring contact 156.

In order that the contact 156 may yield slightly under the impact of contact 157, a yielding connection is provided between the finger 160 and the rock arm 158 in the form of a coil tension spring 166 which permits a yielding movement of the arm 158, even though the finger 160 is rigidly held by the cam 22.

The release of the latch 63 is accomplished by means of a finger 167 on the rotatable shaft 168 which engages a cooperating lug 169 on the latch 63 at the proper time to move the hook 170 of the latch away from in front of the lug 60 on the ratchet wheel 27. The finger 24 serves to advance the ratchet wheel 27 step by step and the lug 25 serves the same purpose as the lug 25 in the construction of Fig. 4.

Further modifications will be apparent to those skilled in the art and it is desired, therefore, that my invention be limited only by the prior art and the scope of the appended claims.

Having thus described my invention, what I claim and desire to secure by Letters Patent is:

1. A device for controlling a circuit which comprises a spring-restrained ratchet, a dog actuating said ratchet, a pawl restraining said ratchet, means for releasing said pawl at predeterminable intervals, means for actuating said dog, an electrical switch actuated by said ratchet, a lever, a cam actuating said lever, a second electrical switch actuated by said lever, said switches being connected in series, and means for actuating said cam.

2. A timing clock comprising two electrical switches in series with each other, means for operating said switches at predetermined intervals comprising an oscillatable ratchet in said clock and a contact member of one switch mounted on said ratchet, a cam-actuated lever in said clock, a contact member of the other switch mounted on said lever, and means for actuating said ratchet and cam.

3. A timing clock comprising a mechanism consisting of two electrical switches connected in series, means for controlling one of said switches comprising a ratchet, a dog operating said ratchet, a pawl restraining said ratchet, a spring biasing said ratchet, and means for releasing said pawl, and means for controlling the other of said switches comprising a lever, a cam reacting against said lever and means for rotating said cam, means comprising a gear-operated mechanism for releasing the said pawl, and a dial and hands thereon indicating the releasing point of said pawl.

4. In a time-controlled mechanism of the type described and comprising a spring-actuated oscillatable ratchet and a stop for the same, means for preventing the rebound of said ratchet on coming to rest against said stop which comprises a latch and a lug on said ratchet co-operating therewith.

5. In a time-controlled mechanism of the type described and comprising a spring-ratchet-operated electrical switch, means for releasing said ratchet and closing said switch which comprises a spring-restrained pawl carried by said ratchet, a second stationary ratchet cooperating with said pawl, and means for releasing said pawl, said means comprising a gear, a pin on said gear, and means for manually moving said gear to set said pin into the desired relationship with said pawl.

6. A time-controlled device comprising a member oscillatable back and forth, time-controlled means for driving said oscillatable member in one direction, and means for quickly returning it, a time-controlled periodically operated electric switch, means whereby said switch is closed slowly and opened rapidly a plurality of times during the time-controlled shift of the oscillatable member, a second switch, means whereby said second switch is closed quickly by the rapid shift of the oscillatable member, and opened slowly by the time-controlled shift of the oscillatable member, the switches being in series whereby the circuit of the two switches is closed only during the time from the instant the second switch is quickly closed until the instant when the first switch is quickly opened.

7. A time-controlled device comprising a member oscillatable back and forth, time-controlled means for driving said oscillatable member in one direction, and means for quickly returning it, a time-controlled periodically operated electric switch, means whereby said switch is closed slowly and opened rapidly a plurality of times during the time-controlled shift of the oscillatable member, a second switch, means whereby said second switch is closed quickly by the rapid shift of the oscillatable member, and opened slowly by the time-controlled shift of the oscillatable member, the switches being in series whereby the circuit of the two switches is closed only during the time from the instant the second switch is quickly closed until the instant when the first switch is quickly opened, said means for controlling the first switch comprising a rotatable cam having an abrupt drop.

8. A time-controlled device comprising a member oscillatable back and forth, time-controlled means for driving said oscillatable member in one direction, and means for quickly returning it, a time-controlled periodically operated electric switch, means whereby said switch is closed slowly and opened rapidly a plurality of times during the time-controlled shift of the oscillatable member, a second switch, means whereby said second switch is closed quickly by the rapid shift of the oscillatable member, and opened slowly by the time-controlled shift of the oscillatable member, the switches being in series whereby the circuit of the two switches is closed only during the time from the instant the second switch is quickly closed until the instant when the first switch is quickly opened, said mechanism having provisions whereby the interval between closing the second switch and opening the first switch may be varied.

9. A time-controlled device comprising a member oscillatable back and forth, time-controlled means for driving said oscillatable member in one direction, and means for quickly returning it, said time-controlled driving means comprising a time-controlled driving member which periodically engages the oscillatable member to give it a step-by-step time-controlled movement, a fixed retaining ratchet, a pawl mounted on the oscillatable member and engaging the retaining ratchet to hold the oscillatable member against premature return movement when the oscillatable member is not engaged by the driving member, means whereby said pawl is placed in inoperative relation with respect to said retaining ratchet during the time-controlled movement of the oscillatable member, and while the driving member is in driving relation with the oscillatable member whereby when the driving member disengages the oscillatable member the oscillatable member will be quickly returned to its original position.

10. A time-controlled device comprising a member oscillatable back and forth, time-controlled means for driving said oscillatable member step by step in one direction, and means for quickly returning it, a stop for limiting the quick return movement, and means other than said driving means for preventing rebound movement of the oscillatable member when it strikes the stop.

11. A time-controlled device comprising a member oscillatable back and forth, time-controlled means for driving said oscillatable member in one direction, and means for quickly returning it, a stop for limiting the quick return movement, and means for preventing rebound movement of the oscillatable member when it strikes the stop, said preventing means comprising a latch.

12. A time-controlled device comprising a member oscillatable back and forth, time-controlled means for driving said oscillatable member in one direction, and means for quickly returning it, an abutment on said oscillatable member, a stop engaged by said abutment to limit the return movement of the oscillatable member, and a latch for engaging said abutment when it strikes said stop to prevent rebound movement of the oscillatable member.

13. A time-controlled circuit controller comprising a rotatable member, time-controlled means for intermittently advancing said rotatable member step-by-step in one direction, means for returning said rotatable member, means for holding said rotatable member in its advanced position against the action of said controlling means, and means for automatically releasing said holding means at a predetermined stage of advance of said rotatable member to permit it to return under the action of said returning means.

14. A time-controlled circuit controller comprising a movable member, time-controlled means for intermittently advancing said movable member step-by-step in one direction, means for returning said movable member, means other than said advancing means for holding said movable member in its advanced position against the action of said return means, means for automatically releasing said holding means at a predetermined stage of advance of said movable member to permit it to return under the action of said returning means, and means whereby the stage of advance at which the release takes place may be varied.

15. A time-controlled circuit controller comprising a rotatable member, time-controlled means for advancing said rotatable member step-by-step in one direction, means for returning said rotatable member, means other than said advancing means for holding said rotatable member in its advanced position against the action of said return means, and means for automatically releasing said holding means at a predetermined stage of advance of said rotatable member to permit it to return under the action of said returning means, and circuit-closing means controlled by the return movement of said rotatable member.

16. A time-controlled circuit controller comprising a rotatable member, time-controlled means for intermittently advancing said rotatable member step-by-step in one direction, means for returning said rotatable member, means other than said advancing means for holding said rotatable member in its advanced position against the action of said return means, and means for automatically releasing said holding means at a predetermined stage of advance of said rotatable member to permit it to return under the action of said returning means, circuit-closing means controlled by the return movement of said rotatable member, and time-controlled circuit opening means.

17. A time-controlled circuit controller comprising a rotatable member, time-controlled means for advancing said rotatable member step-by-step in one direction, means for returning said rotatable member, means for holding said rotatable member in its advanced position against the action of said controlling means, and means for automatically releasing said holding means at a predetermined stage of advance of said rotatable member to permit it to return under the action of said returning means, said holding means comprising a fixed ratchet member and a pawl on said rotatable member cooperating with said ratchet member.

18. A time-controlled circuit controller comprising a rotatable member, time-controlled means for advancing said rotatable member step-by-step in one direction, means for returning said rotatable member, means for holding said rotatable member in its advanced position against the action of said controlling means, and means for automatically releasing said holding means at a predetermined stage of advance of said rotatable member to permit it to return under the action of said returning means, said holding means comprising a fixed ratchet member and a pawl on said rotatable member cooperating with said ratchet member, said releasing means comprising means for rendering said pawl inoperative to cooperate with said ratchet member.

19. A time-controlled circuit controller comprising a rotatable member, time-controlled means for advancing said rotatable member step-by-step in one direction, means for returning said rotatable member, means for holding said rotatable member in its advanced position against the action of said controlling means, and means for automatically releasing said holding means at a predetermined stage of advance of said rotatable member to permit it to return under the action of said returning means, said holding means comprising a fixed ratchet member and a pawl on said rotatable member cooperating with said ratchet member, said releasing means comprising means for rendering said pawl inoperative to cooperate with said ratchet member, said rendering means comprising a latch for holding said pawl inoperative.

20. A time-controlled circuit controller comprising a rotatable member, time-controlled means for advancing said rotatable member step-by-step in one direction, means for returning said rotatable member, means for holding said rotatable member in its advanced position against the action of said controlling means, and means for automatically releasing said holding means at a predetermined stage of advance of said rotatable member to permit it to return under the action of said returning means, said holding means comprising a fixed ratchet member and a pawl on said rotatable member cooperating with said ratchet member, said releasing means comprising means for rendering said pawl inoperative to cooperate with said ratchet member, said rendering means comprising a latch for holding said pawl inoperative, and means for releasing said latch on the return movement of said rotatable member.

21. A time-controlled apparatus comprising two circuit controllers in series, an oscillatable member for controlling the first of said controllers, having a time-controlled movement in one direction for opening said circuit controller, a quick return movement for effecting a quick closing of the circuit controller, and time-controlled means for opening and closing the second circuit controller having provisions for effecting a quick opening of the circuit controller, the timing of the time-controlled means being such that the second controller is closed at the time the quick-closing action of the first circuit controller is effected, and such that the quick opening of the second circuit controller will be effected while the first circuit controller is still closed, and such that the second circuit controller will be open at the time the first circuit controller is opened in its time-controlled movement.

22. A time-controlled circuit-controlling apparatus comprising a circuit controller, an oscillatable member for controlling said controller, time-controlled means for moving said oscillatable member in one direction, means tending to move said oscillatable member in the opposite direction from its time-controlled movement, and manually adjustable rotatable means coaxial with said oscillatable member for effecting the release of said oscillatable member from said time-controlled means to permit its return movement.

23. A time-controlled circuit controlling apparatus comprising an oscillatable member, time-controlled means for moving said oscillatable member in one direction, means tending to move said oscillatable member in the opposite direction from its time-controlled movement, means for effecting the release of said oscillatable member from said time-controlled means to permit its quick return movement, and circuit-controlling means having provisions whereby the circuit is completely and quickly closed by the quick return movement of the oscillatable member and having time-controlled means for completely and quickly opening said circuit after each quick closing action independently of the movement of the oscillatable member.

24. A time-controlled circuit controlling apparatus comprising a circuit controller, an oscillatable member for controlling said controller, time-controlled means for moving said oscillatable member in one direction, comprising a constant speed motor and transmission between said motor and oscillatable member for imparting an intermittent step-by-step movement to the oscillatable member, means tending to move said oscillatable member in the opposite direction from its time-controlled movement, and means for effecting the release of said oscillatable member from said time-controlled means to permit the return movement.

25. A time-controlled circuit controlling apparatus comprising an oscillatable member, time-controlled means for moving said oscillatable member in one direction, means tending to move said oscillatable member in the opposite direction from its time-controlled movement, means for effecting the release of said oscillatable member from said time-controlled means to permit its quick return movement, and circuit-controlling means having provisions whereby the circuit is completely and quickly closed by the quick return movement of the oscillatable member and having time-controlled means for completely and quickly opening said circuit after each quick closing action independently of the movement of the oscillatable member, said circuit-controlling means comprising two spring-mounted contact members movable into and out of engagement with each other, a pair of coaxial pivoted rock members for controlling the spring contacts respectively, time-controlled cam means for periodically operating one of said rock members to bring the contact controlled thereby within the range of movement of the other contact member, said cam having a quick drop to permit its spring contact member to snap quickly out of the range of movement of the other contact member, and means whereby the quick return movement of the oscillatable member quickly moves the other contact against the cam-controlled contact member, the cam and quick return movement being so timed that the contact is closed by the quick return movement and opened by the quick drop cam movement.

26. A time-controlled circuit controlling apparatus comprising an oscillatable member, time-controlled means for moving said oscillatable member in one direction, means tending to move said oscillatable member in the opposite direction from its time-controlled movement, means for effecting the release of said oscillatable member from said time-controlled means to permit its quick return movement, and circuit-controlling means having provisions whereby the circuit is completely and quickly closed by the quick return movement of the oscillatable member and having time-controlled means for completely and quickly opening said circuit after each quick closing action independently of the movement of the oscillatable member, said circuit-controlling means comprising a single pair of contacts which control both the closing and opening of the circuit.

ALBERT E. LONG.